March 29, 1966  W. B. WOODRING  3,242,789

METHOD OF MAKING PLASTIC CARTRIDGE CASE

Original Filed April 12, 1962

INVENTOR.
WILLIAM B. WOODRING

BY Donald R. Trotsko

ATTORNEY

United States Patent Office 3,242,789
Patented Mar. 29, 1966

3,242,789
METHOD OF MAKING PLASTIC
CARTRIDGE CASE
William B. Woodring, Branford, Conn., assignor to Olin Mathieson Chemical Corporation, a corporation of Virginia
Original application Apr. 12, 1962, Ser. No. 187,087, now Patent No. 3,176,614, dated Apr. 6, 1965. Divided and this application Oct. 2, 1964, Ser. No. 408,714
3 Claims. (Cl. 86—11)

This application is a division of co-pending application, Serial Number 187,087 filed April 12, 1962, now Patent No. 3,176,614.

This invention relates to the manufacture of cartridges and more specifically to new and improved explosive cartridges for shotguns, for example, to be fired at the base by an included primer.

Shell cases of light metal and those molded of resinous plastic such as ethyl cellulose, ethyl acetate, plasticized polyvinyl, chloride and polyethylene have been proposed. No matter what the material of which it is made, a propellant shell is a rather special container which must function not only for storing its charge, including wadding, powder and shot, without deterioration, but also for initiating the powder reliably and for projecting shot acceptably through an end closure. Despite firing, the case must not fracture, but because of the shortcomings of many plastic cases because of embrittlement, contamination from fugitive plasticizers and dimensional instability, and/or lack of strength, plastic construction has not been adopted extensively under the severe usage and long storage conditions encountered.

Some shooters frequently insist that the cartridges when spent be reloadable with components to the shooter's own specifications. A resinous plastic shot shell, for example, is desirable wherein the fired case remains intact as long as possible and is reuseable as often as possible before any defect develops to interfere with ignition and prevent reuse.

In an effort to overcome the disadvantage of the use of various plastics and of separate components such as paper in shotgun shells, and in an attempt to realize the benefits of plastics such as polyethylene, those skilled in the art have tried the more rigid linear polyethylene. One approach has been to make the entire shotgun shell casing as one piece molded from linear polyethylene having a high degree of crystallization, a melting point of at least 125° C. and a relatively high density. For various reasons such as the differences in thickness and forces encountered in various sections of the shell, making it by plastic injection molding even by this approach has limitations and leaves much to be desired in obtainment of the best combination of physical properties.

Another approach has been to substitute a section of tube of such linear low pressure polyethylene for the paper tube, but not until the polymer has been oriented uniformly from end to end by stretching a tube of it to develop added strength moderately and substantially uniformly in the rigid high density linear polyolefin.

It will be appreciated that ammunition cartridges are put to rigorous use as in the firing of a shot shell case where great forces are exerted with non-uniformity and over a wide range of temperatures.

One object of this invention, therefore, is to provide plastic bodies of improved effective tensile strength together with a satisfactory elastic limit and yield strength.

Another object is the provision of a novel process for making such bodies economically be deformation of a blank of plastic in the solid state, or molding, and finally prestressing it.

Another object is to provide an article composed of a crystalline polymer of a thermoplastic synthetic resin formed in such a way that exceptionally high strength is obtained adapting the article for use as a container under explosive pressure.

Another object is to form explosive pressure cartridges having improved dimensional stability and performance particularly at the head in the region of the igniter.

Still another object is to economically provide a new and improved shot shell having a plastic side wall tubular portion, preferably of a rigid polyolefin.

Other objects and advantages will be understood from this description of various preferred embodiments contemplated and the accompanying drawing wherein.

It has been found that various disadvantages encountered in the head section of shells having at least a plastic tubular shell wall, or having both the base at the head and also the tube portion formed integrally of plastic can be overcome substantially by putting the plastic at the head in compression at least immediately ahead of the rim and effecting an improved mounting of the primer in the head.

In accordance with this invention the case is formed with a primer pocket in an enlarged head section of the shell either by molding or preferably by compression from a crystallizable thermoplastic such as a suitable polyolefin and then a primer cup is inserted in the pocket forcefully and a ring flared at one end is forced back over the head until abutted and frictionally retained against the head in the region of the primer, preferably contiguous in the front of the rim flange. A squeeze of a few thousandths of an inch is deemed adequate for the purpose in a shot shell of 12 gauge, for example. The shell head enlargement and the metal ring size are selected so that the resulting exterior lateral dimensions at the head is of the correct predetermined gauge and the plastic under sufficient radial compression to effect not only ring retention, but also avoid primer pushout and pocket swelling. Variations in size due to plastic shrinkage and molding or die compression forming is rendered less or no ill effect and the compression further rigidifies shell heads of linear high density polyethylene, for example.

The plastic cartridge case is shaped of a relatively rigid polyolefin, such as polypropylene of high isotacticity and preferably of polyethylene characterized by a high degree of linearity and crystallinity and by a high molecular weight above about 100,000 and preferably as high as from about 350,000 to above about 1,000,000. The polyethylene used in the tubular sidewall of the shell of FIGURE 1 and in the sidewall and integral base of the shell of FIGURE 2 are those produced by any one of various processes under relatively low temperatures and low pressures of polymerization using suitable catalysts in admixture. These contemplated have very high density and molecular weights and a high degree of linearity of the polymer chains. These polyethylenes, as compared to high pressure polyethylenes, have high softening or melting points and are characterized by such an increase in tear, tensile and yield strengths as to be classified as rigid polyethylenes.

Figure 1:
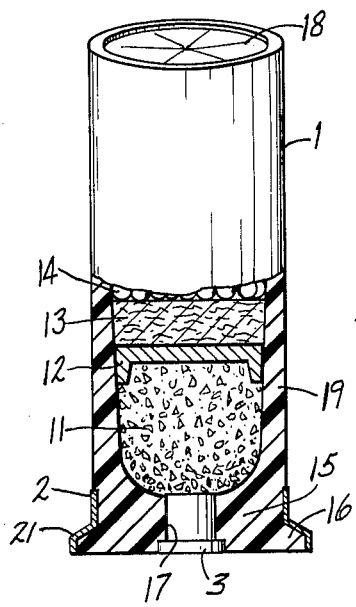
FIGURE 1 is an elevational side view partly in longitudinal cross section showing one construction of a shot shell, particularly details of head structure.
Figure 2:
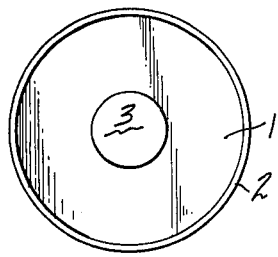
FIGURE 2 is an end view of the head of the cartridge of FIGURE 1.

The shell of FIGURE 1 or tube part of the case of FIGURE 2, for example, may be simply molded of such linear polyethylenes. Tubes of linear polyethylene of the low pressure type may be further treated by stretching to obtain orientation for development of added strength. The shell of FIGURE 2 may be formed by compression according to copending patent application Serial No. 135,569, filed September 1, 1961.

Other plastics of equivalent character are contemplated for the tubular wall portion, either molded or compressively deformed to shape.

The shot shell bodies are formed at least in part by compression from plastic materials such as polyethylene, polypropylene and the like polymers, and/or co-polymers of the same, all finally shaped in the solid crystalline state. High density linear polyolefins specifically are contemplated for forming by compression as distinguished from forming by stretching. By confining the plastic between at least two juxtaposed surfaces exerting pressure on the plastic and by driving plastic with plastic, final shaping to a thin-walled body is achieved advantageously from a relitavely thick slug or blank of the linear polymer to attain a densification and very high increase in strength of the body, preferably so as to increase the tensile strength while decreasing the thickness gradually from the base toward the mouth of the shell.

This is done at a wide range of working temperatures below the crystalline melt temperature of the material and at speeds of compressive deformation limited to prevent an excessive rise in temperature, which is maintained preferably at an elevated temperature range less than the crystalline melt temperature. For polyethylene the working temperatures are held well below the range from about 257° F. to about 265° F., and working occurs preferably from about 200° F. to slightly below 265° F. for available grades and makes of the thermoplastic, working at about 240° F. being found suitable for most materials of this type. For polypropylene, the limiting temperature is somewhat higher and forming occurs below the much wider range from about 275° F. to about 330–335° F. Somewhat higher working temperatures from about 200° F. up to slightly less than 335° F. are contemplated. By compression forming according to this procedure, stable shaping of an article by deformation can occur over a broad range of temperatures below the crystalline melt temperature rather than in a sharply limited narrow range of temperature hovering extremely closely to such crystalline melt temperature, and difficult to maintain.

The crystalline melt temperature of thermoplastic materials such as these is the elevated temperature at which all crystallinity of the polymer structure disappears and it appears clear when viewed through crossed Nichol prisms in a hot-stage microscope. The degree of crystallinity as determined by various methods such as the X-ray diffraction method, is preferably as high as possible for each material; for polypropylene a high degree of isotacticity is also preferred along with maximum possible crystallinity.

Figure 5:
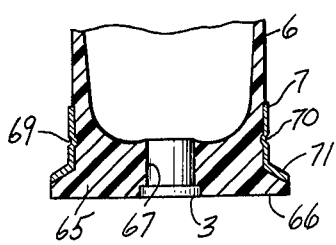
FIGURE 5 shows the portion of another embodiment at the head.

By compressive deformation instead of stretching, necking of the thermoplastic is avoided and very high tensile strength is obtained where needed as shown in FIGURE 5. Compression forming also allows the various parts of the finished article also to be made to different preform dimensions, an advantage which is not secured when material must be stretched out of one part depleting it to supply another as the finished product. Preformed oversize, the shell head is prestressed to size in a ring. It will be appreciated that while the superadded compression of the ring gives improvement in the plastic head, this invention is especially of advantage in making in one piece the main plastic body of the shell having at least two portions differing in shape and function, at least one of which must be stronger than another or which must be thicker than other parts which nevertheless must be nearly as strong or stronger. By this invention at least a superior shell tube is formed, its base and rim stabilized from oversize dimensionally to iron out variations, and preferably a superior whole shell case, sized, sealed and further rigidified by the elastic compression in the ring.

Figure 3:
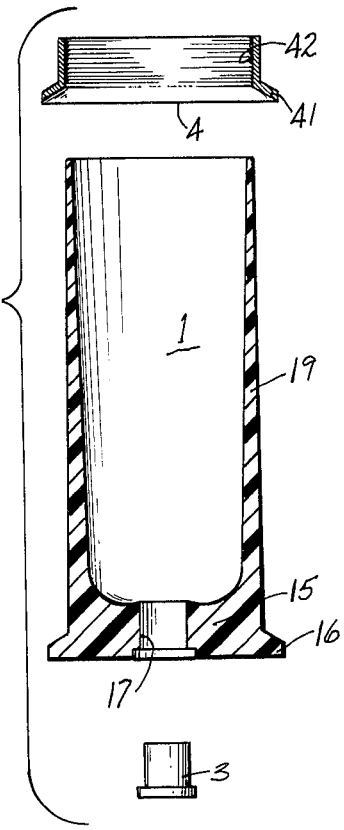
FIGURE 3 is an exploded view taken in longtudinal section showing various shell components of a typical cartridge before and with reference to the method of assembly contemplated.

According to one embodiment of this invention there is provided a one-piece cup-shaped body 1 shown in FIGURE 3 compression-shaped of a suitable high density polyethylene polymerized at relatively low pressure with any one of various suitable catalysts by known processes such as the Zeigler process and also a ring 2 of sheet metal such as brass, aluminum, or steel having a flanged flange 21. This ring is strung over externally tapering tube 19 and press fitted about the shell head 15 and the outer periphery of the rim 16. The squeeze increases toward the base of the body 1. Pocket 17 carries primer cup 3 with frictional or adhesive retention. In the tubular shell wall 19 the shell cavity is loaded with a suitable powder charge 11 an expansible wad such as cup wad 12, a filler wad column 13, and a shot charge 14. The cavity is closed by any suitable evanescent closure and preferably the folded closure 18 to secure improvements in combination with wad 12 according to U.S. Patents Nos. 2,582,124 and 2,582,125 granted to R. S. Holmes.

This arrangement leaves the base of the plastic body bare of the surrounding metal ring as shown in FIGURES 1 and 2.

Compression of the shell base 15 is effected by the process of assembly readily understood in connection with FIGURE 3 where another modification of ring 4 flared at 41 and internally roughened or serrated at 42 with a buttress type of grooving in the one form shown to facilitate slipping the ring back.

The ring may also be heated and shrunk fitted over tubular wall 19 of the preformed plastic body 1, while primer 3 preferably oversized relative to preformed pocket 17 is forced forwardly into the base 15.

Figure 4:
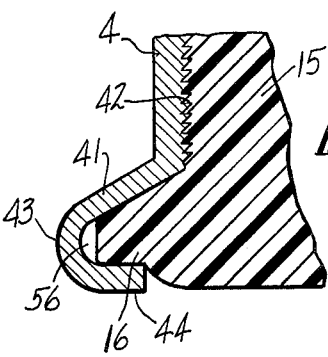
FIGURE 4 is an enlarged fragmentary view taken in cross section in the head of a shell at the rim showing various modifications of the head structure.

The resulting positive retention at grooves 42 is shown in FIGURE 4 with a further preferred modification wherein the ring flare 41 is flanged at 43 to provide a structure like flanged flare 21 of FIGURE 1 with the further differences (a) that the flange 43 is turned or crimped in at 44 to underlie the plastic rim 16 and (b) that a void 56 is left between the periphery of rim 16 and the bulged flange 43. This provides the relief found to minimize the metal rim filling and forcing action of the plastic rim 16 which elastomeric action upon shell firing may not only create a fatigue crack in 43 but may tend to split the metal earlier where a sheet metal cup fully and snugly encloses the shell base and rim 15 and 16.

In FIGURE 5 the plastic body 6 is provided with metal ring 7 having a brief version of the flared flange 71 overlying only the front of the plastic rim 66 of the head 65 carrying primer 3 in pocket 67.

Shell 6 may be formed with a circumferential exterior groove 69 in the region of the head as shown at the left side for brevity with ring 7 only partially assembled. The right side shows the finished assembly wherein the ring is annularly roll crimped at 70 into groove 69 as a final step. Alternately, the ring may be preformed with a cannelure 70 as the head is preformed with groove 69 and plastic 6 and ring 7 may be snap-fitted together.

Flare 41 (FIGURE 3) may cover the front of the finished shell rim as in FIGURE 5 or may be either preflanged or crimped to a flange after telescoping to form the assembly of FIGURES 1 and 2. Alternately flare 41, when provided wide enough, may be doubly flanged as in FIGURE 4.

It will be appreciated that the article of this invention is adapted to a continuous mass production process of assembly. For example, a continuous length of this walled metal tubing may be fed up through the opening of a die plate where the open leading edge of the tubing is flared as by a spinning tool or spreader punch. A plastic shot shell body is then fed, open mouth first down into the flared end of the tubing and while being so fed a wobbler cut-off die is oscillated to shear a suitable length of ring from the flared end of the tubing as it is advanced a bit further up from the die plate. Cutting occurs before the plastic tubular end advances down too far, after which the plastic rim of the head is seated against the flared flange of the ring separated from the tubing.

Although the foregoing is a description of what is now believed preferred, it will also be understood that various modifications and changes may be made therein by those skilled, all in the spirit and scope of this invention as set forth in the appended claims.

What is claimed is:

1. The method of making ammunition cartridge cases comprising the steps of providing a shell body including a tubular side wall of thermoplastic resin having an open mouth at one end and oversize base with an outwardly extending rim and a primer receiving pocket at the other end, slipping an annular metallic ring with an outwardly flared flange over said mouth and forcing said ring down said body until said rim and flange are in abutment to compress the resin of said base radially inwardly between said primer opening and ring.

2. The method of claim 1 including the step of crimping said flange inwardly to surround at least an outer periphery of said rim.

3. The method of claim 1 including the step of crimping said flange inwardly to completely surround said rim.

References Cited by the Examiner

UNITED STATES PATENTS

| 1,845,971 | 2/1932 | Katz | 102—43 |
| 3,164,090 | 1/1965 | Williams et al. | 102—43 |

FOREIGN PATENTS

| 1,093,151 | 11/1954 | France. |
| 1,193,324 | 4/1959 | France. |

BENJAMIN A. BORCHELT, *Primary Examiner.*

R. V. LOTTMANN, *Assistant Examiner.*